United States Patent
Singer

(10) Patent No.: US 9,746,611 B2
(45) Date of Patent: Aug. 29, 2017

(54) SYSTEMS AND METHODS FOR TILTABLE GRATING OUT-COUPLERS

(71) Applicant: THE BOEING COMPANY, Huntington Beach, CA (US)

(72) Inventor: Scott Benjamin Singer, Sherman Oaks, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/944,621

(22) Filed: Nov. 18, 2015

(65) Prior Publication Data

US 2017/0139141 A1 May 18, 2017

(51) Int. Cl.
G02B 6/12 (2006.01)
G02B 6/293 (2006.01)
G02B 6/34 (2006.01)
G02B 6/42 (2006.01)
G01S 7/481 (2006.01)

(52) U.S. Cl.
CPC .......... G02B 6/29314 (2013.01); G01S 7/481 (2013.01); G02B 6/34 (2013.01); G02B 6/4215 (2013.01)

(58) Field of Classification Search
None
See application file for complete search history.

(56) References Cited

U.S. PATENT DOCUMENTS

| 5,003,550 A | 3/1991 | Welch et al. |
| 7,382,959 B1 | 6/2008 | Jacobsen |
| 9,086,229 B1 | 7/2015 | Roper et al. |
| 2013/0176621 A1* | 7/2013 | Miller ................. G02B 5/1861 359/571 |
| 2014/0253918 A1* | 9/2014 | Ozeki ................... G01J 3/4412 356/301 |
| 2015/0323456 A1* | 11/2015 | Agashe ............... B81C 1/00341 356/445 |
| 2016/0158933 A1* | 6/2016 | Taylor ..................... B81B 7/00 74/479.01 |

FOREIGN PATENT DOCUMENTS

| JP | 05232519 | 9/1993 |
| JP | 10111524 | 4/1998 |

OTHER PUBLICATIONS

Extended European Search Report of Application No. 16181404.1, dated Apr. 13, 2017, 9 pages.
Kiang, M. et al., Surface-Micromachined Diffraction Gratings for Scanning Sprectroscopic Applications, IEEE, 1997 pp. 343-345.
Tao, J.F. et al., Ultra-High Coupling Effiency of MEMS Tunable Laser Via 3-Dimensional Micro-Optical Coupling System, IEEE, 2011, pp. 13-16.
Du, Y. et al., A 21.5 kHz High Optical Resolution Electrostatic Double-Layered Vibratory Grating Laser Scanner, Sensors and Actuators A 168, 2011, pp. 253-261.

* cited by examiner

*Primary Examiner* — Sung Pak
(74) *Attorney, Agent, or Firm* — Armstrong Teasdale LLP

(57) ABSTRACT

A grating out-coupler assembly is provided. The grating out-coupler assembly includes a substrate, a tiltable surface suspended above the substrate, an actuator configured to selectively control a pitch of the tiltable surface, and a grating out-coupler supported by the tiltable surface.

23 Claims, 9 Drawing Sheets

SYSTEMS AND METHODS FOR TILTABLE GRATING OUT-COUPLERS

BACKGROUND

The field of the disclosure relates generally to optical communications, and, more particularly, to assemblies that facilitate selectively tilting a grating out-coupler.

At least some known LIDAR systems include a microelectromechanical system (MEMS) mirror. The MEMS mirror may be actuatable using an applied voltage. This actuated MEMS mirror may be used to steer a laser beam for measuring the range of objects within a field of view. However, properly aligning the MEMS mirror may be relatively difficult, resulting in relatively high interference and a poor signal-to-noise ratio.

BRIEF DESCRIPTION

In one aspect, a grating out-coupler assembly is provided. The grating out-coupler assembly includes a substrate, a tiltable surface suspended above the substrate, an actuator configured to selectively control a pitch of the tiltable surface, and a grating out-coupler supported by the tiltable surface.

In another aspect, a LIDAR system is provided. The LIDAR system includes a photonic circuit, and a grating out-coupler assembly coupled to the photonic circuit, the grating out-coupler assembling including a substrate, a tiltable surface suspended above the substrate, an actuator configured to selectively control a pitch of the tiltable surface; and a grating out-coupler supported by the tiltable surface.

In yet another aspect, a method of assembling a LIDAR system is provided. The method includes suspending a tiltable surface above a substrate, the tiltable surface suspended using an actuator configured to selectively control a pitch of the tiltable surface, positioning a grating out-coupler on the tiltable surface, and optically coupling the grating out-coupler to a photonic circuit.

DETAILED DESCRIPTION

The systems and methods described herein provide a grating out-coupler assembly. The assembly includes a tiltable surface suspended above a cavity formed in a substrate. A grating out-coupler is formed on the tiltable surface. Using one or more actuators (e.g., torsion bars), the tiltable surface can be rotated such that an orientation of the grating out-coupler is adjusted. The grating out-coupler may be coupled to a photonic circuit for use as a transmission element or a reception element. As used herein, a grating out-coupler refers to a microelectromechanical system (MEMS) device that is configured to couple light into and/or out of a waveguide.

Figure 1:
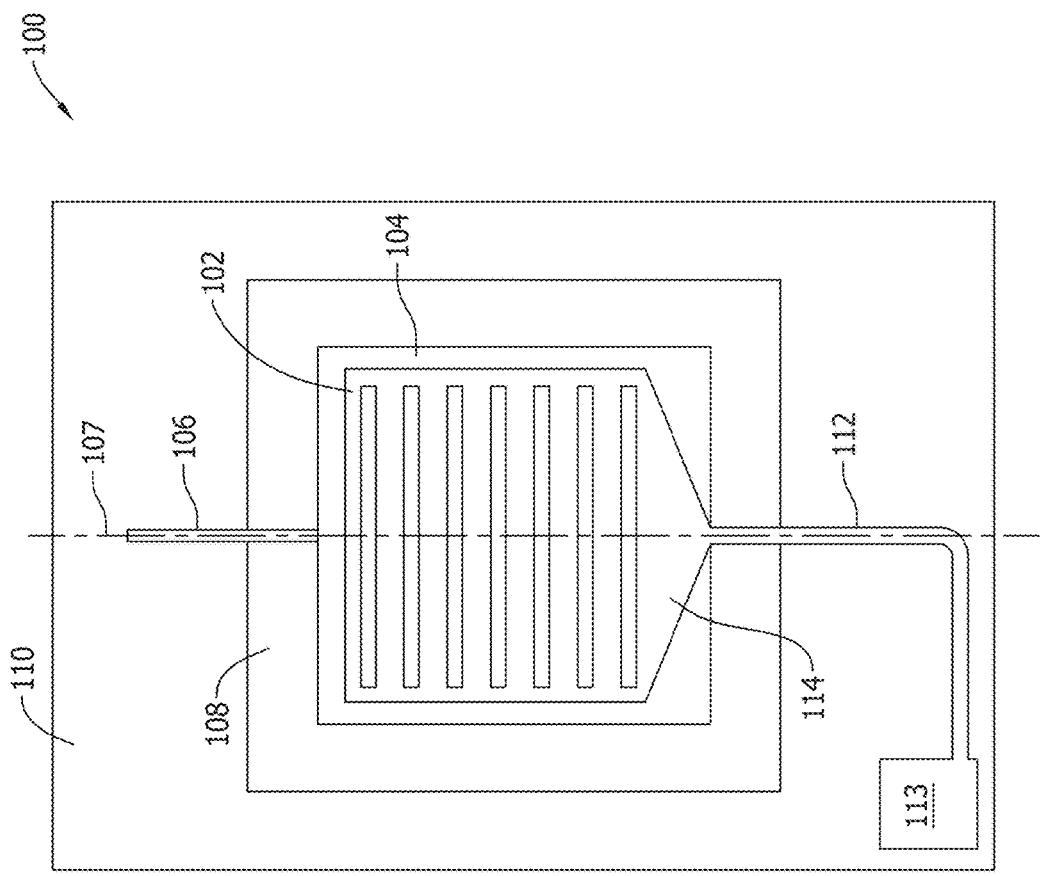
FIG. 1 is a plan view of an exemplary tiltable grating out-coupler assembly.
Figure 2:
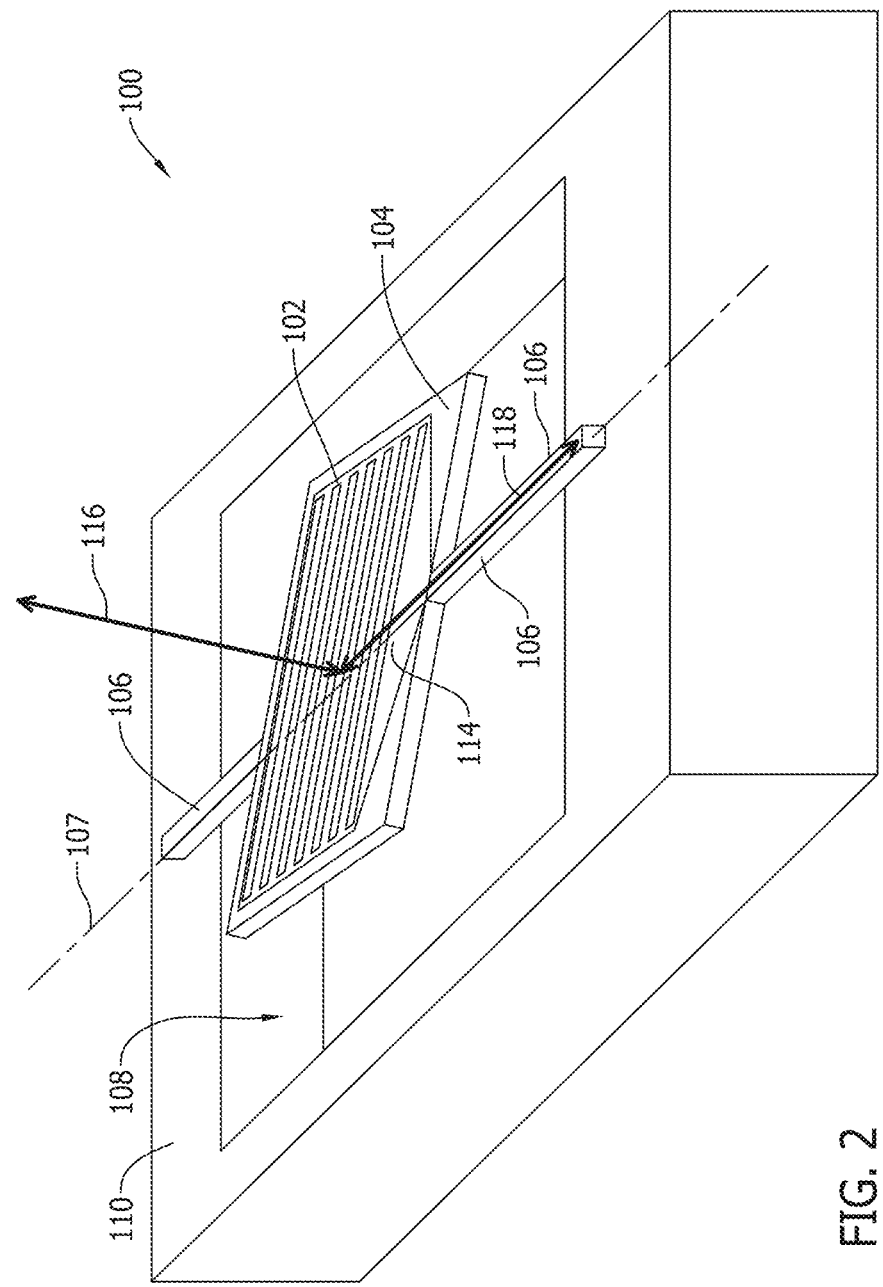
FIG. 2 is a perspective view of the assembly shown in FIG. 1.

FIG. 1 is a plan view of an exemplary tiltable grating out-coupler assembly 100. FIG. 2 is a perspective view of assembly 100. As shown in FIGS. 1 and 2, assembly 100 includes a grating out-coupler 102 that rests on a tiltable surface 104. An actuator 106 coupled to tiltable surface 104 facilitates controlling a pitch of tiltable surface 104. Tiltable surface 104 may rest atop actuator 106, or alternatively, actuator 106 may extend through tiltable surface 104. In the exemplary implementation, actuator 106 is a torsion bar. Specifically, rotating actuator 106 along a longitudinal axis 107 of actuator 106 causes the pitch of tiltable surface 104 to change. That is, actuator 106 is made from a relatively flexible material that allows actuator 106 to twist and rotate about longitudinal axis 107. In the exemplary implementation, tiltable surface 104 (and by extension grating out-coupler 102) is capable of one-dimensional tilt (i.e., about longitudinal axis 107 of actuator 106). Alternatively, in other implementations, assembly 100 may include external gimbals or other actuators that enable two-dimensional tilt.

As shown in FIG. 2, in assembly 100, tiltable surface 104 is suspended by actuator 106 above a substrate 110, and in particular, above a cavity 108 formed in substrate 110. Cavity 108 allows tiltable surface 104 to be tilted without contacting substrate 110. Cavity 108 may have a depth of approximately 15 microns (μm) and length and width dimensions (i.e., in directions parallel to a plane formed by tiltable surface 104) of approximately 2 millimeters (mm) by 2 mm. Alternatively, cavity 108 may have any suitable dimensions. In some embodiments, the depth of cavity 108 extends through the entire substrate 110. Alternatively, the depth of cavity 108 may only extend through a portion of substrate 11, as seen best in FIG. 3. Further, in some embodiments, assembly 100 may not include cavity 108. Instead, tiltable surface 104 may be suspended above substrate 110 using sacrificial layers (e.g., for a silicon substrate, a silicon oxide layer and a silicon layer) that are grown and then etched away selectively to form tiltable surface 104.

To facilitate transmitting and receiving optical signals, in the exemplary implementation, grating out-coupler 102 is coupled to a waveguide 112 via an optical taper 114. Optical taper 114 is a device configured to expand a width of the optical mode from waveguide 112 to grating out-coupler 102 when transmitting light from assembly 100, and is configured to compress the width of the optical mode from grating out-coupler to waveguide 112 when receiving light at assembly 100. For example, assume waveguide 112 has a first width, w1. Accordingly, the mode of the light within waveguide 112 is confined within a cross-section of w1*z (where z is a depth dimension). The light enters optical taper 114, which adiabatically expands the width of the optical mode until it reaches a second width, w2. Now the light is confined within a cross-section of w2*z. The second width w2 is matched to the width of grating out-coupler 102. For light received as assembly 100, optical taper 114 adiabatically compresses a width of the optical mode from w2 to w1.

Accordingly, optical taper 114 bridges the differing widths between waveguide 112 and grating out-coupler 102 with minimum loss.

In the exemplary implementation, waveguide 112 extends across a portion of actuator 106. Specifically, waveguide 112 is positioned atop actuator 106, and is also made of a flexible material, such that when actuator 106 is twisted about longitudinal axis 107, a portion of waveguide 112 also twists. Notably, the twisting of waveguide 112 does not significantly affect the light propagating abilities of waveguide 112. Waveguide 112 couples grating out-coupler 102 to an optical transmitter and/or receiver 113. Although transmitter/receiver 113 is shown schematically on substrate 110, those of skill will appreciate that transmitter/receiver 113 may be separate from assembly 100. Light propagates into and out of grating out-coupler 102 along a first direction 116, and propagates within waveguide 112 along a second direction 118 that is substantially orthogonal to first direction 116. That is, grating out-coupler 102 absorbs/emits light in a direction normal to a plane formed by grating out-coupler 102.

Figure 3:
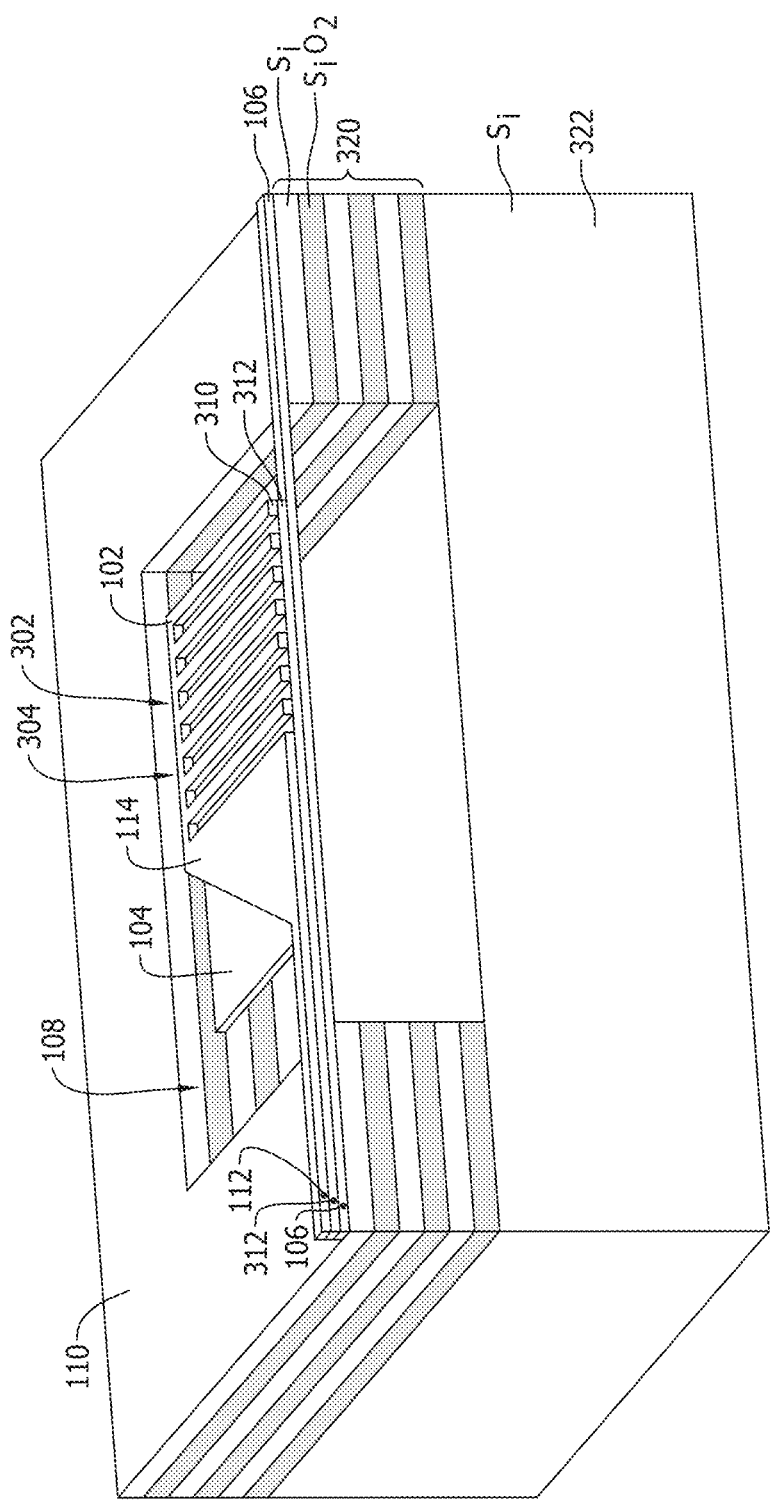
FIG. 3 is a perspective view of the assembly shown in FIG. 2 showing a cross-section of the assembly.

FIG. 3 is a perspective view of assembly 100 showing a cross-section of assembly 100. As shown in FIG. 2, a plurality of parallel grooves 302 are formed in grating out-coupler 102 to form a grating structure 304. In the exemplary implementation, to facilitate optical coupling, grating out-coupler 102, optical taper 114, and waveguide 112 are formed from a first material 310 having a relatively high refractive index (e.g., silicon, poly-silicon, gallium arsenide, etc.) on top of a second, lower index material 312 (e.g., aluminum oxide, silicon oxide, etc.). For example, grating structure 304 may be formed by forming grooves 302 in first material 310, but not in second material 312. In one example, first material 310 has a refractive index greater than 2.5 and second material 312 has a refractive index in a range from approximately 1.5 to 2.5. Alternatively, first and second materials 310 and 312 may have any suitable optical properties. In one implementation, actuator 106, tiltable surface 104, and substrate 110 are be formed using an alternating structure of polysilicon and silicon oxide layers.

As shown in FIG. 3, substrate 110 includes a plurality of MEMS layers 320 formed on top of a base 322. In the exemplary implementation, MEMS layers 320 include alternating layers of silicon and silicon oxide, and base 322 is silicon. Alternatively, MEMS layers 320 and base 322 may be formed of any suitable material.

Substrate 110 may be formed, for example, using a chemical vapor deposition process, in which base 322 and MEMS layers 320 are formed by depositing lattices of silicon and silicon oxide. The deposition process will form a cuboid structure, and cavity 108 may be formed by removing material from the cuboid structure. The dimensions of cavity 108, base 322, and MEMS layers 320 will vary based on the wavelength of light being coupled using grating out-coupler 102.

Figure 4:
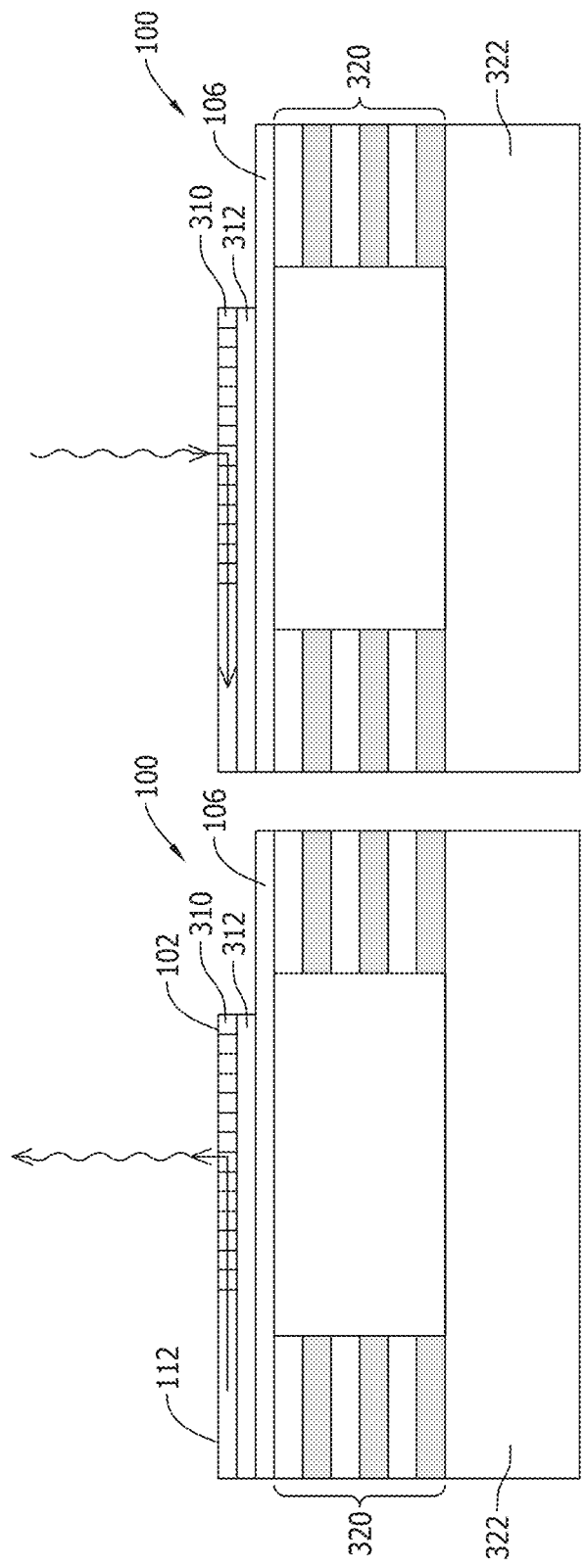
FIG. 4A is a diagram showing propagation of light through the assembly shown in FIG. 1 in a transmission mode.
FIG. 4B is a diagram showing propagation of light through the assembly shown in FIG. 1 in a reception mode.

FIG. 4A is a diagram showing propagation of light out of assembly 100 in a transmission mode, and FIG. 4B is a diagram showing propagation of light into assembly 100 in a reception mode. In the transmission mode, light propagates along waveguide 112 in a surface propagating mode and is emitted from grating out-coupler 102 in a direction dependent on a tilt angle of grating out-coupler 102 and substantially perpendicular to the direction of transmission through waveguide 112. In the reception mode, light is received at grating out-coupler 102, and transmitted along waveguide 112 in a surface-propagating mode in a direction substantially perpendicular to the direction of the light being received at grating out-coupler 102. As described above, grating out-coupler 102 may be used in optical communication applications to couple light into and/or out of waveguide 112 for transmission to and/or transmission from transmitter/receiver 113 (shown in FIG. 1).

Figure 5:
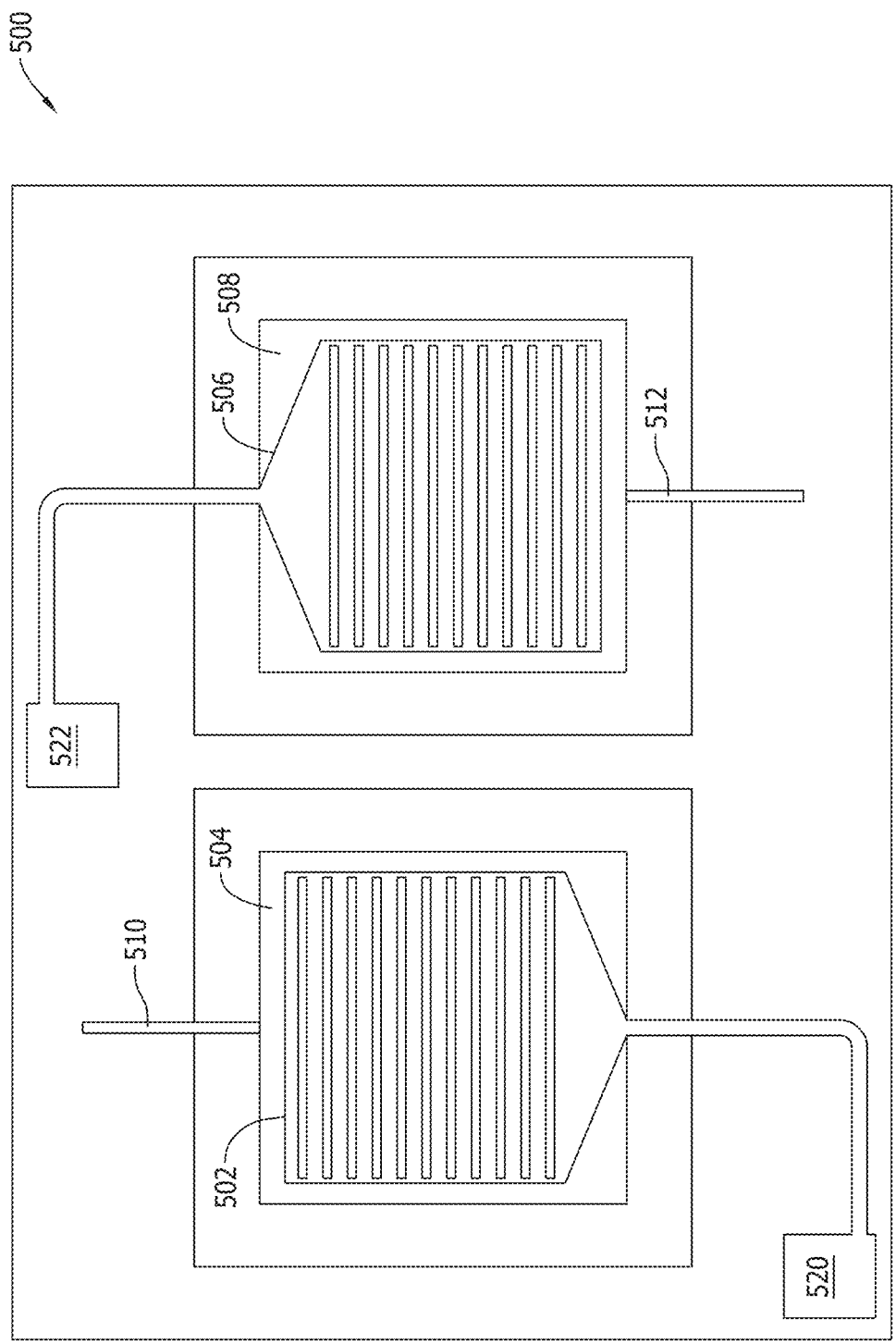
FIG. 5 is a plan view of an alternative tiltable grating out-coupler assembly.

In the implementation shown in FIGS. 1-4B, assembly 100 includes a single grating out-coupler 102 that optically couples light to/from transmitter/receiver 113. Alternatively, assemblies in other implementations may include multiple grating out-couplers. For example, FIG. 5 is a plan view of an alternative grating out-coupler assembly 500. Assembly 500 includes a first grating out-coupler 502 on a first tiltable surface 504 (such as grating out coupler 102 and tiltable surface 104), and a second grating out-coupler 506 on a second tiltable surface 508. Similar to assembly 100, first tiltable surface 504 is tiltable using a first actuator 510, and second tiltable surface 508 is tiltable using a second actuator 512.

In the exemplary implementation, first grating out-coupler 502 functions as a transmission element to couple light out of a transmitter 520, and second grating out-coupler 506 functions as a reception element to couple light into a receiver 522. Including both transmission and reception elements in the same assembly permits assembly 500 to be used in a system-on-a-chip application, such as in a frequency-modulated continuous-wave (FMCW) LIDAR system. Further, first grating out-coupler 502 and second grating out-coupler 506 may be tilted at the same or different orientations. This allows assembly 500 to isolate a return signal from a specific direction (e.g., the same direction in which a signal is transmitted from assembly 500), which facilitates preventing interference from other units.

Figure 6:
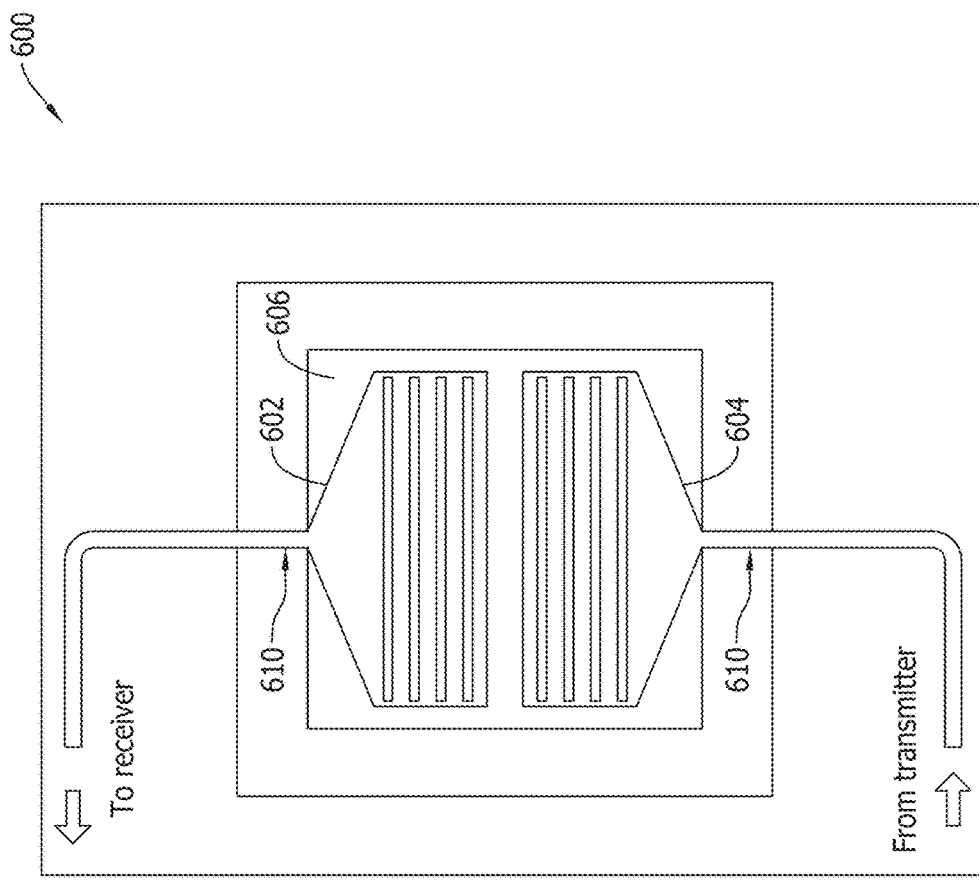
FIG. 6 is a plan view of an alternative tiltable grating out-coupler assembly.

FIG. 6 is a plan view of another alternative grating out-coupler assembly 600. Assembly 600 includes a first grating out-coupler 602 and second grating out-coupler 604 that are both on a tiltable surface 606. Tiltable surface 606 is tilted using an actuator 610, similar to actuator 106 (shown in FIG. 1). In the exemplary implementation, first grating out-coupler 602 functions as a transmission element, and second grating out-coupler 604 functions as a reception element. Including both transmission and reception elements in the same assembly permits assembly 600 to be used in a system-on-a-chip application, such as in a FMCW LIDAR system. Notably, because first grating out-coupler 602 and second grating out-coupler 604 are on the same tiltable surface 606, first grating out-coupler 602 and second grating out-coupler 604 are tilted at the same orientation, using the same actuator 610, substantially eliminating any errors in synching the orientation of first grating out-coupler 602 and second grating out-coupler 604.

Figure 7:
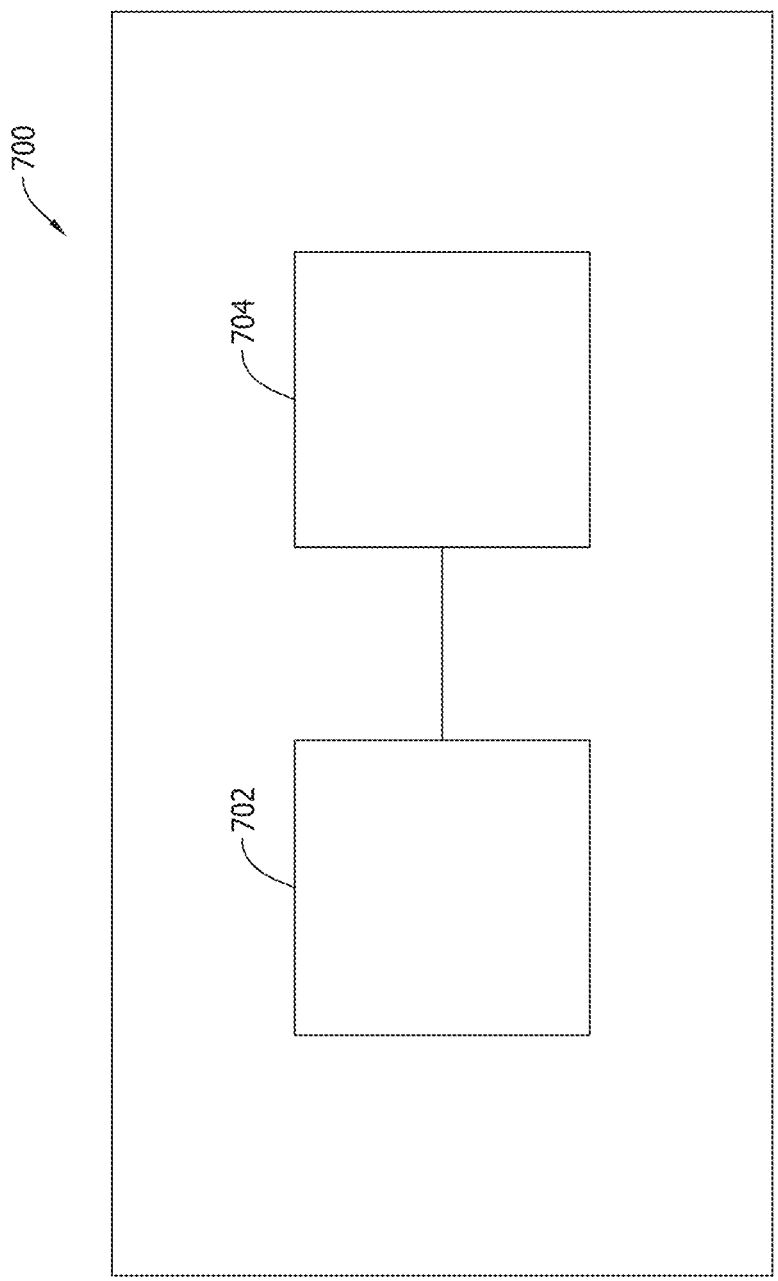
FIG. 7 is a block diagram of an exemplary LIDAR system that includes a tiltable grating out-coupler assembly.

FIG. 7 is a block diagram of an exemplary LIDAR system 700 that includes a tiltable grating out-coupler assembly 702, such as assembly 100 (shown in FIG. 1), assembly 500 (shown in FIG. 5), or assembly 600 (shown in FIG. 6). Assembly 702 is coupled to a photonic circuit 704 for transmitting signals from and/or receiving signals at photonic circuit 704. Photonic circuit 704 may include, for example, transmitter/receiver 113 (shown in FIG. 1). LIDAR system 700 may be, for example, a chip-scale frequency modulated continues wavelength (FMCW) LIDAR. LIDAR system 700 may be used, for example, for range-finding applications (e.g., used by autonomous vehicles), biological applications, directed energy applications, and/or communications applications.

Figure 8:
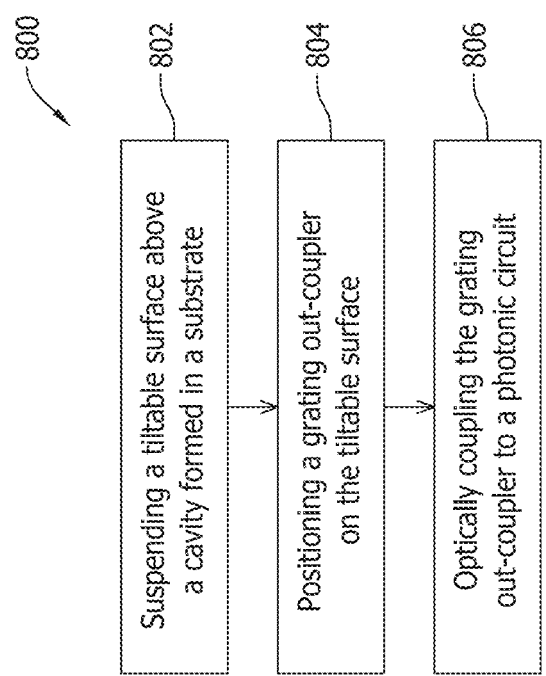
FIG. 8 is a flowchart of an exemplary method for assembling a LIDAR system.

FIG. 8 is a flowchart of an exemplary method 800 for assembling a LIDAR system, such as LIDAR system 700. Method 800 includes suspending 802 a tiltable surface above a cavity formed in a substrate, the tiltable surface suspended using an actuator configured to selectively control a pitch of the tiltable surface. As described above, the substrate may be formed using a chemical vapor deposition process. Method 800 further includes positioning 804 a grating out-coupler on the tiltable surface. Method 800 further includes optically coupling 806 the grating out-coupler to a photonic circuit.

Figure 9:
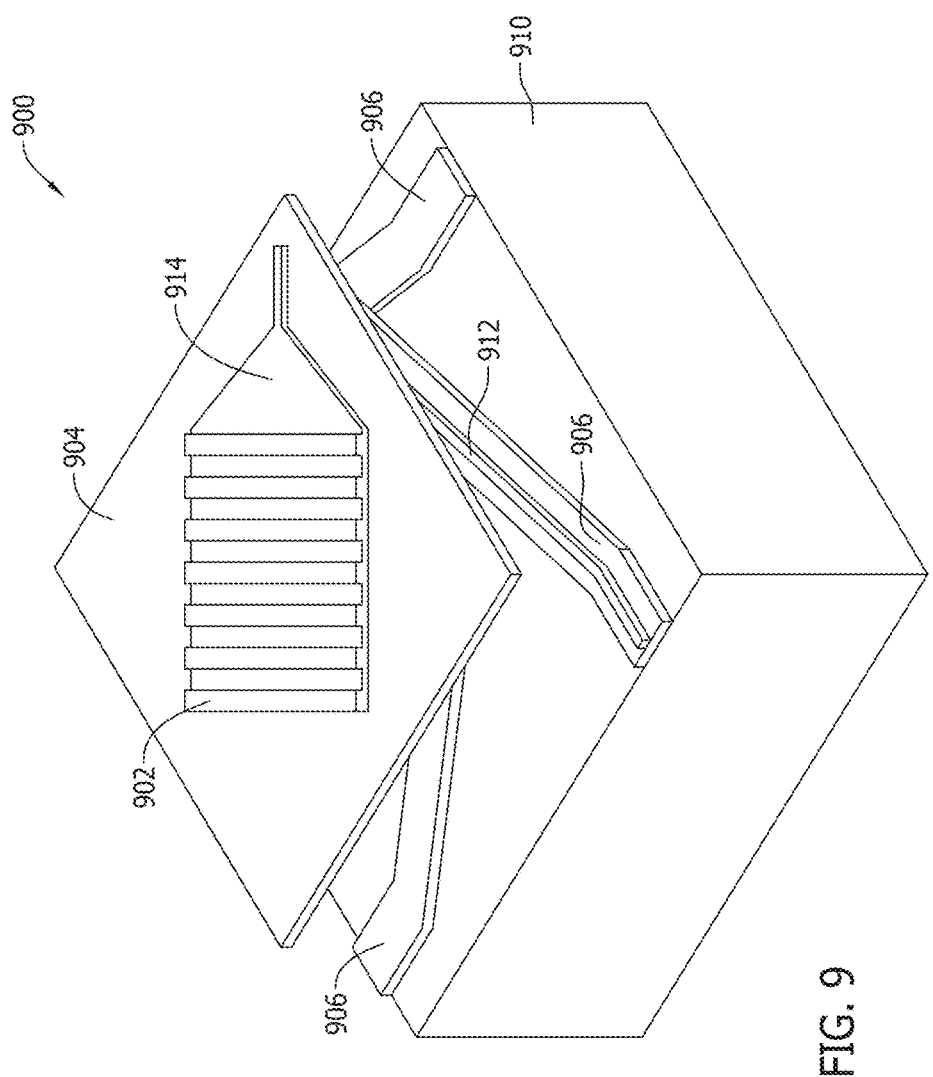
FIG. 9 is a perspective view of an alternative tiltable grating out-coupler assembly.

FIG. 9 is a perspective view of an alternative grating out-coupler assembly 900. As compared to assembly 100, assembly 900 does not include a cavity. Instead, a grating out-coupler 902 rests on a tiltable surface 904 that is elevated and suspended above a substrate 910 by a plurality of actuators 906. In the exemplary implementation, tiltable surface 904 is suspended by four actuators 906 that may be selectively manipulated to orient tiltable surface 904 at a plurality of different orientations. Alternatively, assembly 900 may include any suitable number and type of actuators 906. Similar to grating out-coupler 102, grating out-coupler 902 is optically coupled to a waveguide 912 via an optical taper 914. In this implementation, waveguide 912 passes through tiltable surface 904 and runs along one actuator 906.

Notably, the grating out-coupler assemblies described herein may be fabricated monolithically with the remainder of a photonic circuit. This facilitates avoiding costly and error-prone steps generally required to integrate optical elements needed to steer a beam of light, such as bonding of additional reflectors (which requires very accurate alignment to function properly). Known structures also introduce optical losses at each interface. These losses are avoided using the systems and methods described herein due to the integrated nature of the assembly. Losses reduced by the systems and methods described herein include imperfect reflectivity at mirror surfaces, absorption in bonding media, and wavefront distortion due to mirror imperfections. In particular, eliminating wavefront distortion enables achieving higher signal-to-noise ratios and resolution in coherent detection application, because a phase relationship is substantially maintained across the entire signal.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A grating out-coupler assembly comprising:
   a substrate;
   a tiltable surface suspended above said substrate;
   an actuator configured to selectively control a pitch of said tiltable surface;
   a grating out-coupler supported by said tiltable surface; and
   a waveguide extending across a portion of said actuator and optically coupled to said grating out-coupler, said waveguide configured to couple said grating out-coupler to one of a transmitter and a receiver of a photonic circuit.

2. A grating out-coupler assembly in accordance with claim 1, further comprising a second grating out-coupler.

3. A grating out-coupler assembly in accordance with claim 2, wherein said grating out-coupler is configured to function as a transmission element, and wherein said second grating out-coupler is configured to function as a reception element.

4. A grating out-coupler assembly in accordance with claim 2, wherein said tiltable surface supports both said grating out-coupler and said second grating out-coupler.

5. A grating out-coupler assembly in accordance with claim 2, further comprising:
   a second tiltable surface supporting said second grating out-coupler; and
   a second actuator configured to selectively control a pitch of said second tiltable surface.

6. A grating out-coupler assembly in accordance with claim 5, wherein a pitch of said tiltable surface is adjustable independent of the pitch of said second tiltable surface.

7. A grating out-coupler assembly in accordance with claim 1, wherein said actuator comprises a torsion bar that suspends said tiltable surface above a cavity formed in said substrate.

8. A LIDAR system comprising:
   a photonic circuit; and
   a grating out-coupler assembly coupled to said photonic circuit, said grating out-coupler assembling comprising:
      a substrate;
      a tiltable surface suspended above said substrate;
      an actuator configured to selectively control a pitch of said tiltable surface;
      a grating out-coupler supported by said tiltable surface; and
      a waveguide extending across a portion of said actuator and optically coupled to said grating out-coupler, said waveguide configured to couple said rating out-coupler to one of a transmitter and a receiver of said photonic circuit.

9. A LIDAR system in accordance with claim 8, wherein said grating out-coupler assembly comprises a second grating out-coupler.

10. A LIDAR system in accordance with claim 9, wherein said grating out-coupler is configured to function as a transmission element, and wherein said second grating out-coupler is configured to function as a reception element.

11. A LIDAR system in accordance with claim 9, wherein said tiltable surface supports both said grating out-coupler and said second grating out-coupler.

12. A LIDAR system in accordance with claim 9, wherein said grating out-coupler assembly comprises:
   a second tiltable surface supporting said second grating out-coupler; and
   a second actuator configured to selectively control a pitch of said second tiltable surface.

13. A LIDAR system in accordance with claim 12, wherein a pitch of said tiltable surface is adjustable independent of a pitch of said second tiltable surface.

14. A LIDAR system in accordance with claim 8, wherein said actuator comprises a torsion bar that suspends said tiltable surface above a cavity formed in said substrate.

15. A method of assembling a LIDAR system, said method comprising:
   suspending a tiltable surface above a substrate, the tiltable surface suspended using an actuator configured to selectively control a pitch of the tiltable surface;
   positioning a grating out-coupler on the tiltable surface; and positioning a waveguide extending across a portion of the actuator to optically couple the grating out-coupler to a photonic circuit.

16. A method in accordance with claim 15, further comprising positioning a second grating out-coupler on a second tiltable surface.

17. A method in accordance with claim 16, further comprising adjusting pitches of the tiltable surface and the second tiltable surface independent of one another.

18. A method in accordance with claim 15, further comprising positioning a second grating out-coupler on the tiltable surface.

19. A method in accordance with claim 15 further comprising depositing alternating layers of silicon and silicon oxide on a base layer to form the substrate.

20. A method in accordance with claim 19 further comprising removing a portion of the alternating layers to form a cavity in the substrate above which the tiltable surface is suspended.

21. A grating out-coupler assembly in accordance with claim 7, wherein said substrate comprises an alternating structure of polysilicon and silicon oxide layers.

22. A grating out-coupler assembly in accordance with claim 2, wherein said second grating out-coupler is supported by said tiltable surface.

23. A grating out-coupler assembly in accordance with claim 2, wherein said actuator is further configured to synchronously control the pitch of the grating out-coupler and the second grating out-coupler.

* * * * *